(12) United States Patent
Sahraei et al.

(10) Patent No.: US 11,743,086 B2
(45) Date of Patent: *Aug. 29, 2023

(54) TONE RESERVATION FOR PEAK TO AVERAGE POWER RATIO REDUCTION

(71) Applicant: QUALCOMM Incorporated, San Diego, CA (US)

(72) Inventors: Saeid Sahraei, San Diego, CA (US); Gokul Sridharan, Sunnyvale, CA (US); Hung Dinh Ly, San Diego, CA (US); June Namgoong, San Diego, CA (US); Krishna Kiran Mukkavilli, San Diego, CA (US); Naga Bhushan, San Diego, CA (US); Tingfang Ji, San Diego, CA (US); Peter Gaal, San Diego, CA (US); Taesang Yoo, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/306,755

(22) Filed: May 3, 2021

(65) Prior Publication Data

US 2021/0344544 A1 Nov. 4, 2021

Related U.S. Application Data

(60) Provisional application No. 63/019,808, filed on May 4, 2020.

(51) Int. Cl.
*H04L 27/26* (2006.01)
*H04W 72/0453* (2023.01)

(52) U.S. Cl.
CPC ..... *H04L 27/2614* (2013.01); *H04W 72/0453* (2013.01)

(58) Field of Classification Search
CPC ............ H04L 27/2614; H04L 27/2618; H04L 5/0057; H04L 5/0053; H04L 5/005; H04L 5/0051; H04W 72/0453; Y02D 30/70
See application file for complete search history.

(56) References Cited

U.S. PATENT DOCUMENTS 9,929,890 B2 * 3/2018 Park ...................... H04L 27/262
11,516,058 B2 * 11/2022 Mukkavilli ........... H04W 76/27
(Continued)

OTHER PUBLICATIONS

Krongold, Brian S.; PAR Reduction In The Uplink For OFDMA Systems; Jul. 2-5, 2006, 2006 IEEE 7th Workshop on Signal processing Advances in Wireless Communication.*
(Continued)

*Primary Examiner* — Jay P Patel
(74) *Attorney, Agent, or Firm* — Harrity & Harrity, LLP

(57) ABSTRACT

Various aspects of the present disclosure generally relate to wireless communication. In some aspects, a user equipment may receive a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and transmit a data transmission using a waveform based at least in part on the resource allocation. Numerous other aspects are provided.

30 Claims, 5 Drawing Sheets

(56) References Cited

U.S. PATENT DOCUMENTS

| | | | |
|---|---|---|---|
| 2007/0242598 A1 | 10/2007 | Kowalski | |
| 2008/0298490 A1 | 12/2008 | Yun et al. | |
| 2010/0080113 A1* | 4/2010 | Yang | H04L 27/2618 370/344 |
| 2021/0266036 A1* | 8/2021 | Namgoong | H04B 3/238 |
| 2021/0266210 A1* | 8/2021 | Namgoong | G06N 3/08 |
| 2021/0288854 A1* | 9/2021 | Mukkavilli | H04L 27/2618 |

OTHER PUBLICATIONS

Kiambi Stephen et al.: Use of Preset Reserved Tones in Reduction of PAPR in OFDM Systems; Sep. 1, 2019; 2019 IEEE AFRICON.*
International Search Report and Written Opinion—PCT/US2021/030704—ISA/EPO—dated Jul. 30, 2021.

* cited by examiner

TONE RESERVATION FOR PEAK TO AVERAGE POWER RATIO REDUCTION

CROSS-REFERENCE TO RELATED APPLICATION

This Patent Application claims priority to U.S. Provisional Patent Application No. 63/019,808, filed on May 4, 2020, entitled "TONE RESERVATION FOR PEAK TO AVERAGE POWER RATIO REDUCTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for tone reservation for peak to average power ratio reduction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and transmitting a data transmission using a waveform based at least in part on the resource allocation.

In some aspects, a method of wireless communication, performed by a base station, may include transmitting a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and receiving a data transmission comprising a waveform based at least in part on the resource allocation.

In some aspects, a UE for wireless communication may include memory; one or more processors operatively coupled to the memory; and instructions stored in the memory. The instructions in the memory may be operable, when executed by the one or more processors, to cause the UE to receive a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and transmit a data transmission using a waveform based at least in part on the resource allocation.

In some aspects, a base station for wireless communication may include memory; one or more processors operatively coupled to the memory; and instructions stored in the memory. The instructions in the memory may be operable, when executed by the one or more processors, to cause the base station to transmit a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and receive a data transmission comprising a waveform based at least in part on the resource allocation.

In some aspects, a non-transitory computer-readable medium may store one or more instructions for wireless communication that, when executed by one or more processors of a UE, may cause the UE to receive a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and transmit a data transmission using a waveform based at least in part on the resource allocation.

In some aspects, a non-transitory computer-readable medium may store one or more instructions for wireless communication that, when executed by one or more processors of a base station, may cause the base station to transmit a resource allocation indicating a plurality of transmission tones comprising a subset of data tones of a plurality of data tones and a subset of PRTs of a plurality of PRTs, wherein the resource allocation indicates a plurality of data tone locations within a particular bandwidth, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and receive a data transmission comprising a waveform based at least in part on the resource allocation.

In some aspects, an apparatus for wireless communication may include means for receiving a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and means for transmitting a data transmission using a waveform based at least in part on the resource allocation.

In some aspects, an apparatus for wireless communication may include means for transmitting a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and means for receiving a data transmission comprising a waveform based at least in part on the resource allocation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
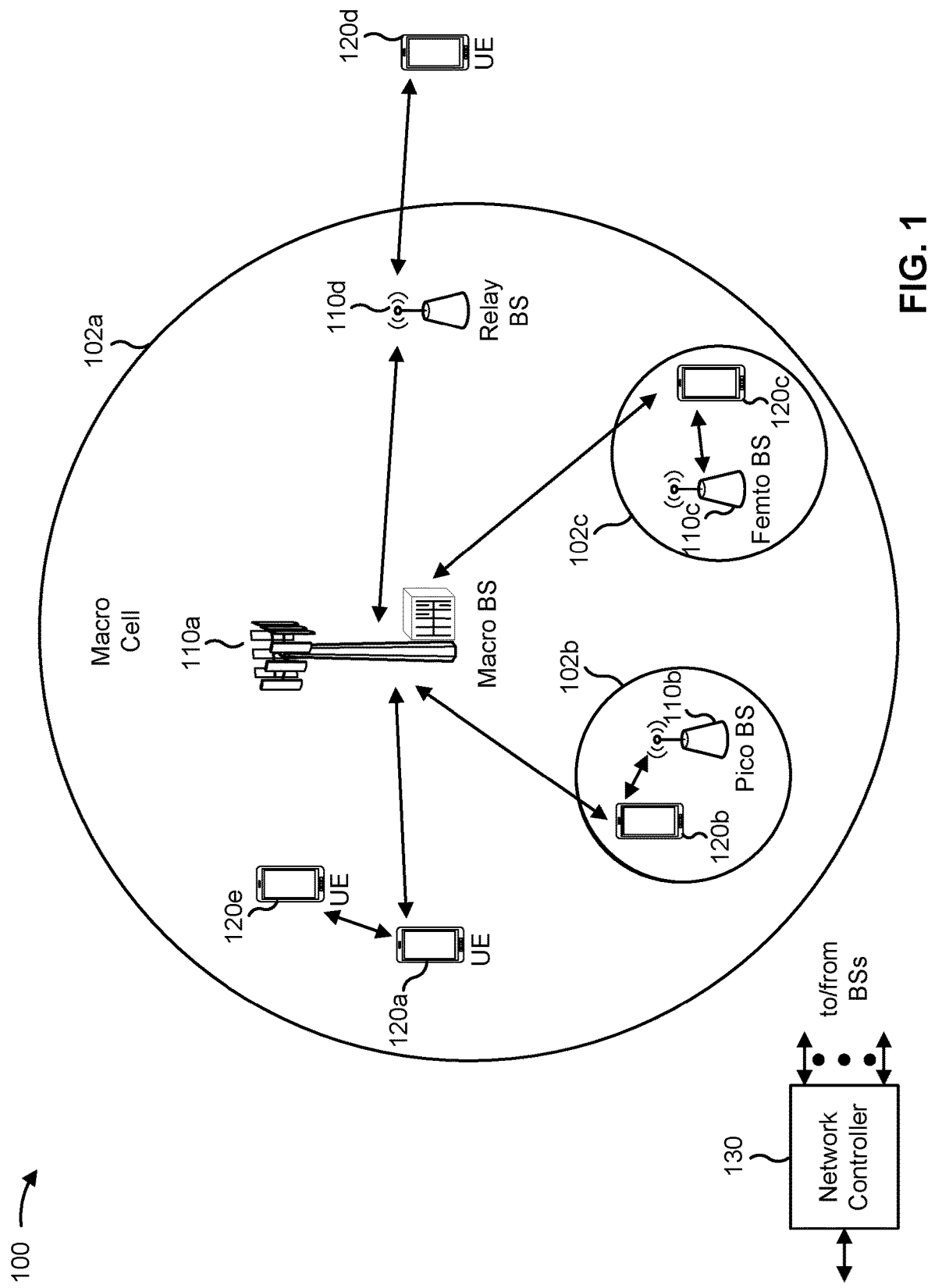
FIG. 1 is a diagram illustrating an example of a wireless network, in accordance with the present disclosure.

Typical methods for peak reduction tone (PRT) selection for reducing peak to average power ratio (PAPR) in a power amplifier of a UE using an orthogonal frequency division multiplexing (OFDM) signal may introduce unnecessary processing that may create a reduction in performance. Additionally, the selection of the PRTs may not be known by the base station, and thus would need to be signaled to the base station to facilitate decoding by the base station, thereby increasing signaling overhead. Aspects of techniques and apparatuses described herein may facilitate PRT reservation for reducing PAPR of a power amplifier in a UE. In some aspects, tone reservation techniques described herein may facilitate PRT location determination based on established patterns, sequences, tables, and/or the like. In some aspects, a PRT sequence may correspond to an allocated set of frequency resources. A base station may indicate the PRT sequence to the UE. In this way, PRT location may be determined without optimizing random PRT index selection in real time, thereby reducing the complexity of the transmitter's operation. This may facilitate savings in power and time during transmission, thereby improving performance, reducing computational burden, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
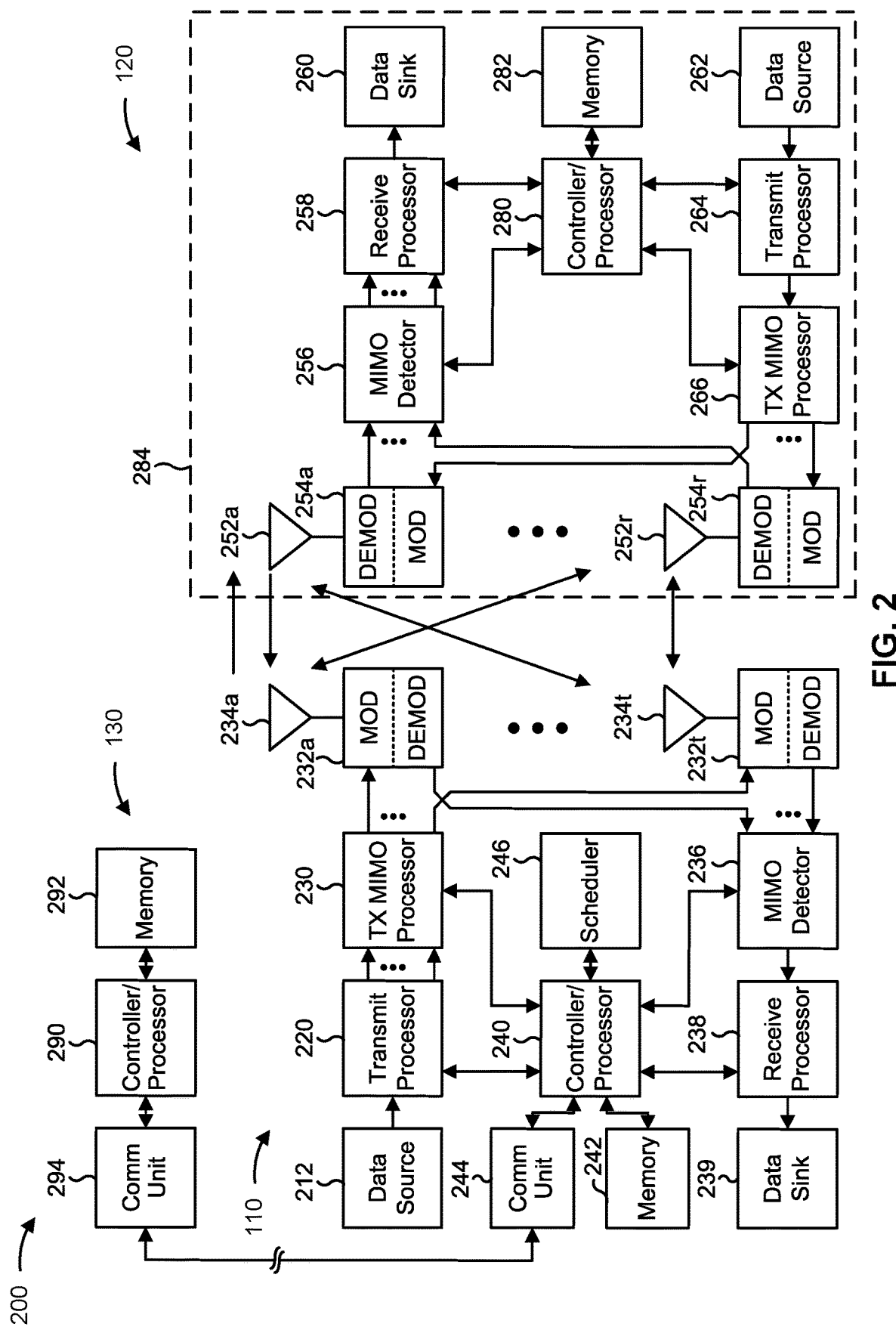
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with tone reservation for peak to average power ratio (PAPR) reduction, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

Figure 4:
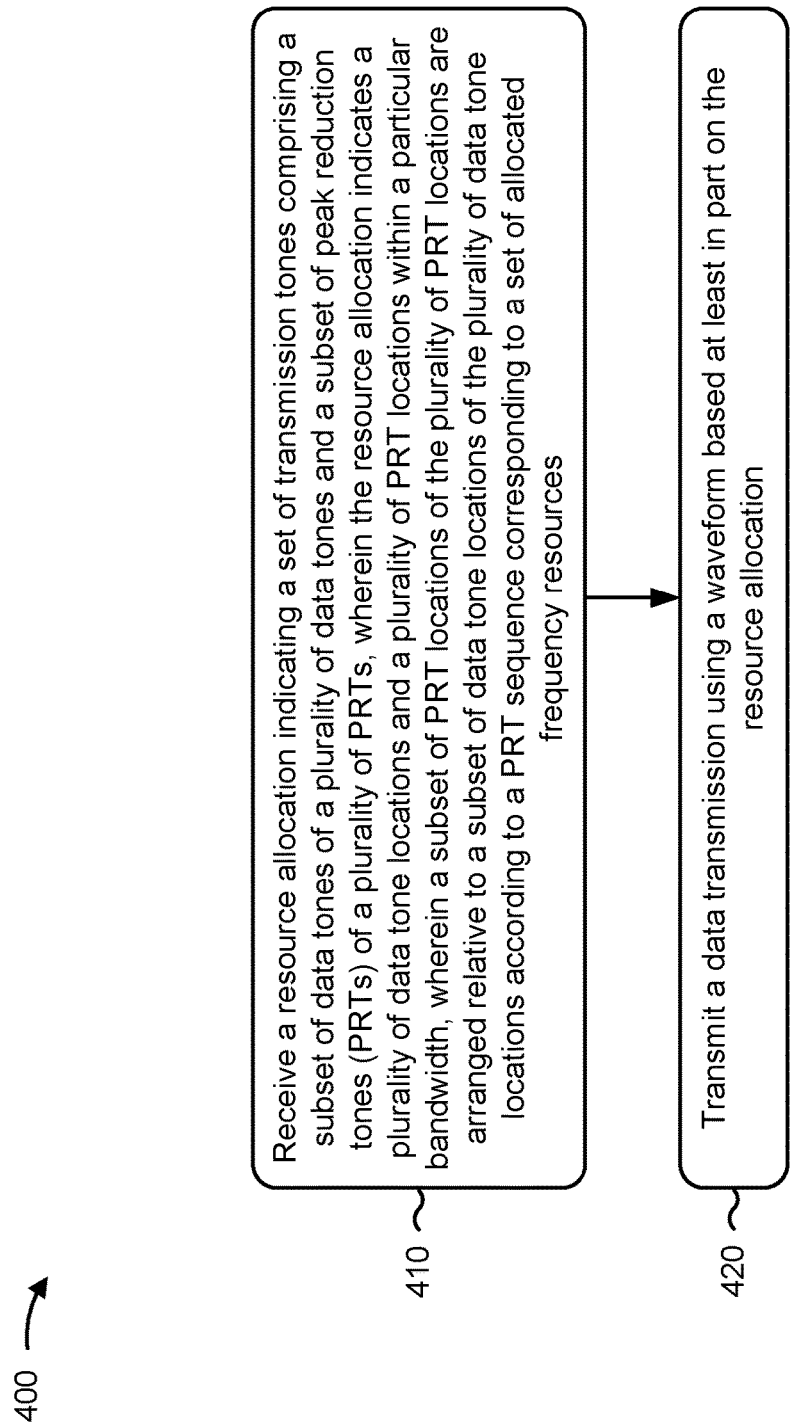
FIG. 4 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 400 of FIG. 4, and/or other processes as described herein. The stored program codes, when executed by processor 240 and/or other processors and modules at base station 110, may cause the base station 110 to perform operations described with respect to process 500 of FIG. 5, and/or other processes as described herein. A scheduler 246 may schedule UEs for data transmission on the downlink and/or uplink.

In some aspects, UE 120 may include means for receiving a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources, means for transmitting a data transmission using a waveform based at least in part on the resource allocation, and/or the like. In some aspects, such means may include one or more components of UE 120 described in connection with FIG. 2.

In some aspects, base station 110 may include means for transmitting a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources, means for receiving a data transmission comprising a waveform based at least in part on the resource allocation, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Commercial power amplifiers typically have a non-linear behavior if operated at high input power. This non-linearity may result in in-band and out-of-band distortion of the signal, and degraded error vector magnitude (EVM) at a receiver of the signal. To avoid non-linearity, the power amplifier may be operated at a mean input power that is several dB lower than the saturation point. An appropriate power level may be determined by determining an input power that maintains a peak to average power ratio (PAPR) of the signal below a certain level.

Orthogonal frequency division multiplexing (OFDM) signals are known to suffer from significant PAPR that grows rapidly by the size of the frequency block. 5G NR is being developed to support higher data rates than LTE. Thus, 5G NR OFDM block sizes may be larger than LTE block sizes, thereby further increasing PAPR of signals. Some PAPR reduction techniques may be data-dependent and computationally expensive, making them unfit for a real-time implementation in the context of a 5G NR transmitter. As a result, clipping and filtering (CF) is often used in the industry. CF results in in-band distortion and often does not converge to a desirable solution.

5G NR provides an abundance of bandwidth both in the uplink and downlink. This is true both due to the addition of Frequency Range 2 (FR2) in 5G NR as well as an increase in the available bandwidth to 100 MHz in the Sub-6 GHz frequency range. This excess bandwidth is partially exploited by using longer OFDM symbols, which further increases the PAPR for OFDM. The excess bandwidth may also be exploited for PAPR reduction via a technique known as tone reservation.

Tone reservation may allow a transmitter to utilize some of the otherwise-idle tones for reducing the PAPR of an OFDM signal. The magnitude and the phase of the reserved tones may be optimized for a given OFDM symbol to minimize the PAPR of the associated signal. In some cases, there may be no overlap between the data tones and reserved tones. In this way, tone reservation may be used without introducing any EVM or adjacent channel leakage ratio. The receiver may simply ignore the portion of the signal associated with the reserved tones and only decode the portion of the signal associated with the data tones.

Tone reservation may be performed by determining PRTs that are configured to reduce peaks of the resulting OFDM signal so that the PAPR of the resulting signal satisfies a threshold. PRTs may be generated using a signal to clipping noise ratio tone reservation (SCR-TR) algorithm. The SCR-TR algorithm may be used to optimize the value of PRT tones based at least in part on their locations.

A UE may be allocated a plurality of N transmission tones having a corresponding plurality of tone location indices, $\{1, \ldots, N\}$. If $\Phi$ is a subset of $\{1, \ldots, N\}$ corresponding to the PRT locations, the remaining transmission tone locations may be allocated to data tones, having a subset, $\{1, \ldots, N\} \backslash \Phi$, of tone location indices. A frequency domain kernel, $P_i$, may be constructed such that:

$$P_i = \begin{cases} 1 & \text{if} \quad i \in \Phi \\ 0 & \text{if} \quad i \in [N] \backslash \Phi \end{cases}$$

and p=iDFT(P). X may be the frequency domain data. Thus, $X_i=0$, if $i \in \Phi$ and x=iDFT(X).

According to the SCR-TR algorithm, the location of the largest peak of x is identified, and the index thereof represented by $j \in [LN]$, where L is the oversampling factor. The SCR-TR includes circularly shifting p, $p^j$=circshift(p,j), so that the peaks are aligned. The SCR-TR further includes subtracting the scaled and shifted p from x to obtain:

$$x_{new} = x - \frac{|x(j)| - \mu}{p(0)} p_j e^{i \angle x(j)},$$

where $\mu$ is the target peak, $\angle x(j)$ is the phase of x(j), $i=\sqrt{-1}$. This process is iterated several times to reduce several peaks. The time-domain kernel p looks like a narrow delta if the number of reserved tones is sufficiently large and the locations are chosen properly. Additionally, circularly shifting p in the time-domain does not impact the location of PRTs in the frequency domain—it only disturbs their phase.

In some cases, PRT location selection may be performed by randomly selecting a plurality of PRT indices representing PRT locations, generating an OFDM signal based on the PRTs and the data tones, and determining whether the PAPR of the resulting signal satisfies a PAPR threshold. However, due to the random nature of the PRT selection for each iteration, these methods may introduce unnecessary processing that may create a reduction in performance. Additionally, the selection of the PRTs may not be known by the base station, and thus would need to be signaled to the base station to facilitate decoding by the base station, thereby increasing signaling overhead.

Aspects of techniques and apparatuses described herein may facilitate PRT reservation for reducing PAPR of a power amplifier in a UE. In some aspects, tone reservation techniques described herein may facilitate PRT location determination based on established patterns, sequences, tables, and/or the like. In this way, PRT location may be determined without optimizing random PRT index selection in real time, thereby reducing the complexity of the transmitter's operation. This may facilitate savings in power and time during transmission, thereby improving performance, reducing computational burden, and/or the like.

In some aspects, a base station may allocate a plurality of transmission tones comprising a plurality of data tones and a plurality of PRTs to a UE. The plurality of transmission tones may indicate a plurality of PRT locations arranged relative to a plurality of data tone locations according to a PRT sequence associated with a particular frequency domain allocation. In some aspects, a standard PRT sequence may be used for all resource allocations, and the base station may indicate that PRT sequence to the UE, which can shift the PRT sequence in the frequency domain to align with the resource allocation. In this way, aspects of the techniques described herein provide a simple PRT selection that facilitates PRT location determination with little processing overhead, signaling overhead, and/or the like. In some aspects, different PRT patterns may be associated with different resource allocation bandwidths, PAPR levels, amounts of data to transmit, and/or the like. In this way, PRT allocation may be at least partly based on characteristics of the UE and/or transmission, which may facilitate more efficient use of resources.

Figure 3:
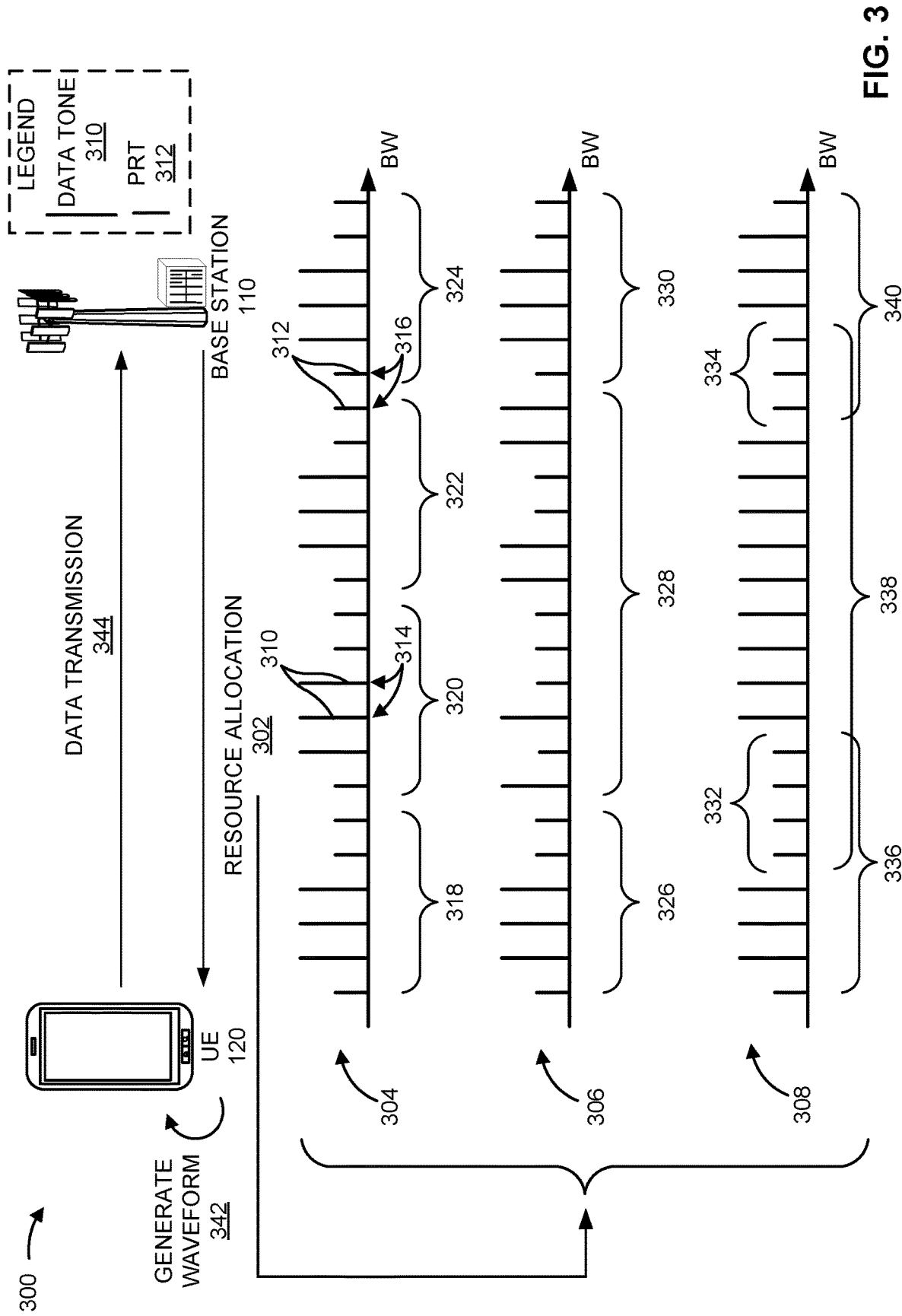
FIG. 3 is a diagram illustrating an example of tone reservation for peak to average power ratio reduction, in accordance with various aspects of the present disclosure.

FIG. 3 is a diagram illustrating an example 300 of tone reservation for peak to average power ratio reduction, in accordance with various aspects of the present disclosure. As shown, a base station 110 and a UE 120 may communicate with one another.

As shown by reference number 302, the base station 110 may transmit, and the UE 120 may receive, a resource allocation. In some aspects, the resource allocation may be carried in downlink control information (DCI), a radio resource control (RRC) message, a medium access control (MAC)-control element (CE), and/or the like. The resource allocation may indicate a set 304, 306, or 308 of transmission tones. The set 304, 306, or 308 of transmission tones may include a plurality of data tones 310 (shown by the longer vertical bars) and a plurality of PRTs 312 (shown by the shorter vertical bars). The resource allocation may indicate a plurality of data tone locations 314 within a particular bandwidth (shown as "BW"). The resource allocation may indicate a plurality of PRT locations 316 within the particular bandwidth.

In some aspects, as shown in connection with the set 304 of transmission tones, the plurality of PRT locations 316 may be arranged relative to the plurality of data tone locations 314 according to a PRT sequence 318, 320, 322, or 324. In some aspects, the plurality of PRT locations 316 may be arranged relative to the plurality of data tone locations 314 according to a PRT sequence 318, 320, 322, or 324 corresponding to a set of allocated frequency resources. In some aspects, the allocated frequency resources may include a set of RBs allocated to the UE 120, a frequency range allocated to the UE 120, and/or the like.

In some aspects, the PRT sequence 318, 320, 322, or 324 may include a shifted version of a PRT pattern, wherein the PRT pattern corresponds to an additional plurality of allocated frequency resources. As shown, for example, each of the PRT sequences 318, 320, 322, and 324 are shifted versions of the same PRT pattern. In this way, a number of UEs 120 may use the same PRT pattern, shifted in the frequency domain to align with the respective frequency resource allocations.

In some aspects, the resource allocation may indicate the PRT sequence 318, 320, 322, or 324 by indicating a deterministic function for determining the PRT sequence 318, 320, 322, or 324. In some aspects, the deterministic function may include a pseudo-random number generator to generate the PRT sequence 318, 320, 322, or 324. The pseudo-random number generator may be based at least in part on a seed. In some aspects the resource allocation may indicate the seed. In some aspects, the resource allocation may indicate the PRT sequence 318, 320, 322, or 324 by indicating an index corresponding to the PRT sequence 318, 320, 322, or 324. In some aspects, the resource allocation may indicate the PRT sequence 318, 320, 322, or 324 by including a reference to a PRT table (PRTT).

In some aspects, the set of allocated frequency resources may include a set of resource blocks (RBs), and the UE 120 may determine, using the PRTT, the PRT sequence 318, 320, 322, or 324 based at least in part on the set of RBs. In some aspects, the PRTT may include a plurality of entries. An entry of the plurality of entries may include the PRT sequence 318, 320, 322, or 324 corresponding to a set of RBs, an additional PRT sequence 318, 320, 322, or 324 corresponding to an additional set of RBs, one or more parameters of a deterministic function for determining the PRT sequence 318, 320, 322, or 324, and/or the like.

As shown in connection with the set 306 of transmission tones, a PRT sequence 326, 328, and/or 330 may be determined based at least in part on a quantity of RBs associated with the set of allocated frequency resources, a PRT usage ratio, and/or the like. In some aspects, the resource allocation may indicate the PRT sequence by including a reference to a PRTT, and the UE 120 may determine, using the PRTT, the PRT sequence 326, 328, or 330 based at least in part on a PRT usage ratio corresponding to the resource allocation.

In some aspects, the PRT usage ratio may include a ratio of a quantity of PRTs in the subset of PRTs 312 to a quantity of data tones in the subset of data tones 310. In some aspects, the PRT usage ratio may be based at least in part on an amount of data that the UE is to transmit in the data transmission, a PAPR associated with the UE, and/or the like. In some aspects, the PRT usage ratio may be based at least in part on an amount of data that the UE is to transmit in the data transmission satisfying a data amount threshold, a PAPR associated with the UE 120 satisfying a PAPR threshold, and/or the like.

In some aspects the PRTT may include a first entry corresponding to a PRT sequence 326. The first entry may be associated with a first PRT usage ratio range that includes the PRT usage ratio. A second entry may correspond to an additional PRT sequence 328 different than the PRT sequence 326. In some aspects, the second entry may be associated with a second PRT usage ratio range that includes an additional PRT usage ratio.

In some aspects, an amount of data that the UE 120 is to transmit in the data transmission may be larger than an amount of data that another UE 120 is to transmit in another data transmission. The PRT usage ratio may be smaller than the additional PRT usage ratio. In some aspects, a first PAPR associated with the UE 120 may be greater than a second PAPR associated with an additional UE 120. In some aspects, the PRT usage ratio may be larger than the additional PRT usage ratio. The PRT usage ratio may be set due to any number of different factors. A cell-edge UE 120 for instance, may need to transmit at a high power for the base station 110 to receive the transmission. In this case, a larger PRT usage ratio may help the UE 120 to reduce its PAPR further, which may allow the UE120 to transmit at a higher power without causing significant distortion and/or out-of-band emission. It also may be possible to assign a large PRT usage ratio to a given UE 120 due to the presence of many idle RBs available in the uplink.

For example, as shown, a first PRT sequence 326 may be associated with a frequency allocation of one RB, a second PRT sequence 328 may be associated with a frequency allocation of two RBs, and a third PRT sequence 330 may be associated with a frequency allocation of one RB. In some aspects, the first and third PRT sequences 326 and 330 may be based on the same PRT pattern.

In some aspects, the set of allocated frequency resources may include a set of RBs and the UE 120 may determine, using the PRTT, the PRT sequence 326, 328, or 330 based at least in part on a quantity of RBs in the set of RBs. The PRTT may include a first entry corresponding to the first PRT sequence 326. In some aspects, the first entry may be associated with a first quantity of RBs and a second entry may be associated with an additional PRT sequence 328 different than the first PRT sequence 326, and the second entry may be associated with a second quantity of RBs.

As shown in connection with the set 308 of transmission tones, in some aspects, a subset 332 or 334 of PRTs 312 may be associated with more than one resource allocation corresponding to more than one UE 120. For example, as shown, a first subset 332 of PRTs 312 may be associated with a first resource allocation 336 and a second resource allocation 338. Similarly, as shown, a second subset 334 of PRTs 312 may be associated with the second resource allocation 338 and a third resource allocation 340. In some aspects, first resource allocation 336 and the second resource allocation 338 are adjacent to one another in the frequency domain, and the second and third resource allocations are adjacent to one another in the frequency domain. In some aspects, the subset 332 of PRTs 312 may correspond to a side-band associated with a UE associated with the resource allocation 336, a side-band associated with a UE associated with the resource allocation 338, and/or the like.

In some aspects, the base station 110 may transmit, and the UE 120 may receive, a rate-matching indication that indicates one or more resources associated with the subset of PRTs 312 to be rate matched around. In some aspects, transmitting the data transmission may include rate-matching around the one or more resources based at least in part on the rate-matching indication. In some aspects, the one or more resources are associated with one or more power constraints corresponding to another UE 120. The data transmission may be transmitted based at least in part on a condition that the subset of PRTs 312 does not overlap the subset of data tones 310. In some aspects, the condition may be based at least in part on a failure to receive a rate-matching indication.

As shown by reference number 342, the UE 120 may generate the waveform based at least in part on the resource allocation. In some aspects, the UE 120 may generate the waveform by determining an inverse discrete Fourier transform of the plurality of transmission tones. In some aspects, the waveform may include a CP-OFDM waveform. In some aspects, the waveform may include a DFT-s-OFDM waveform. In some aspects, the plurality of PRTs may be selected such that a PAPR associated with the waveform satisfies a PAPR threshold.

As shown by reference number 344, the UE 120 may transmit, and the base station 110 may receive, a data transmission using the waveform.

As indicated above, FIG. 3 is provided as an example. Other examples may differ from what is described with respect to FIG. 3.

FIG. 4 is a diagram illustrating an example process 400 performed, for example, by a UE, in accordance with various aspects of the present disclosure. Example process 400 is an example where the UE (e.g., UE 120 and/or the like) performs operations associated with tone reservation for PAPR reduction.

As shown in FIG. 4, in some aspects, process 400 may include receiving a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources (block 410). For example, the UE (e.g., using receive processor 258, controller/processor 280, memory 282, and/or the like) may receive a resource allocation indicating a plurality of transmission tones comprising a subset of data tones of a plurality of data tones and a subset of PRTs of a plurality of PRTs, as described above. In some aspects, the resource allocation indicates a plurality of data tone locations and a plurality of PRT locations within a particular bandwidth. In some aspects, a subset of PRT locations of the plurality of PRT locations are arranged relative to a subset of data tone locations of the plurality of data tone locations according to a PRT sequence corresponding to a set of allocated frequency resources.

As further shown in FIG. 4, in some aspects, process 400 may include transmitting a data transmission using a waveform based at least in part on the resource allocation (block 420). For example, the UE (e.g., using transmit processor 264, controller/processor 280, memory 282, and/or the like) may transmit a data transmission using a waveform based at least in part on the resource allocation, as described above.

Process 400 may include additional aspects, such as any single aspect or any combination of aspects described below and/or in connection with one or more other processes described elsewhere herein.

In a first aspect, the resource allocation is carried in at least one of: DCI, an RRC message, a MAC-CE, or a combination thereof.

In a second aspect, alone or in combination with the first aspect, process 400 includes generating the waveform by determining an inverse discrete Fourier transform of the plurality of transmission tones.

In a third aspect, alone or in combination with one or more of the first and second aspects, the waveform comprises a CP-OFDM waveform or a DFT-s-OFDM waveform.

In a fourth aspect, alone or in combination with one or more of the first through third aspects, the subset of PRTs are selected such that a PAPR associated with the waveform satisfies a PAPR threshold.

In a fifth aspect, alone or in combination with one or more of the first through fourth aspects, the PRT sequence comprises a shifted version of a PRT pattern, and the PRT pattern corresponds to an additional set of allocated frequency resources.

In a sixth aspect, alone or in combination with one or more of the first through fifth aspects, the resource allocation indicates the PRT sequence by indicating a deterministic function for determining the PRT sequence.

In a seventh aspect, alone or in combination with one or more of the first through sixth aspects, the deterministic function comprises a pseudo-random number generator to generate the PRT sequence.

In an eighth aspect, alone or in combination with one or more of the first through seventh aspects, the pseudo-random number generator comprises a seed.

In a ninth aspect, alone or in combination with one or more of the first through eighth aspects, the resource allocation indicates the seed.

In a tenth aspect, alone or in combination with one or more of the first through ninth aspects, the resource allocation indicates the PRT sequence by indicating an index corresponding to the PRT sequence.

In an eleventh aspect, alone or in combination with one or more of the first through tenth aspects, the resource allocation indicates the PRT sequence by including a reference to a PRTT.

In a twelfth aspect, alone or in combination with one or more of the first through eleventh aspects, the set of allocated frequency resources comprises a set of RBs, and process 400 includes determining, using the PRTT, the PRT sequence based at least in part on the set of RBs.

In a thirteenth aspect, alone or in combination with one or more of the first through twelfth aspects, the PRTT comprises a plurality of entries, and an entry of the plurality of entries comprises at least one of: the PRT sequence, wherein the PRT sequence corresponds to a set of RBs, an additional PRT sequence corresponding to an additional set of RBs, one or more parameters of a deterministic function for determining the PRT sequence, or a combination thereof.

In a fourteenth aspect, alone or in combination with one or more of the first through thirteenth aspects, the set of allocated frequency resources comprises a set of RBs, and process 400 includes determining, using the PRTT, the PRT sequence based at least in part on a quantity of RBs in the set of RBs.

In a fifteenth aspect, alone or in combination with one or more of the first through fourteenth aspects, the PRTT comprises: a first entry corresponding to the PRT sequence, wherein the first entry is associated with a first quantity of RBs; and a second entry corresponding to an additional PRT sequence, different than the PRT sequence, wherein the second entry is associated with a second quantity of RBs.

In a sixteenth aspect, alone or in combination with one or more of the first through fifteenth aspects, process 400 includes determining, using the PRTT, the PRT sequence based at least in part on a PRT usage ratio corresponding to the resource allocation, wherein the PRT usage ratio comprises a ratio of a quantity of PRTs in the subset of PRTs to a quantity of data tones in the subset of data tones.

In a seventeenth aspect, alone or in combination with one or more of the first through sixteenth aspects, the PRT usage ratio is based at least in part on at least one of: an amount of data that the UE is to transmit in the data transmission, a PAPR associated with the UE, or a combination thereof.

In an eighteenth aspect, alone or in combination with one or more of the first through seventeenth aspects, the PRT usage ratio is based at least in part on at least one of: an amount of data that the UE is to transmit in the data transmission satisfying a data amount threshold, a PAPR associated with the UE satisfying a PAPR threshold, or a combination thereof.

In a nineteenth aspect, alone or in combination with one or more of the first through eighteenth aspects, the PRTT comprises: a first entry corresponding to the PRT sequence, wherein the first entry is associated with a first PRT usage ratio range that includes the PRT usage ratio; and a second entry corresponding to an additional PRT sequence different than the PRT sequence, wherein the second entry is associated with a second PRT usage ratio range that includes an additional PRT usage ratio.

In a twentieth aspect, alone or in combination with one or more of the first through nineteenth aspects, an amount of data that the UE is to transmit in the data transmission is larger than an amount of data that another UE is to transmit in another data transmission, and the PRT usage ratio is smaller than the additional PRT usage ratio.

In a twenty-first aspect, alone or in combination with one or more of the first through twentieth aspects, a first PAPR associated with the UE is greater than a second PAPR associated with an additional UE, and the PRT usage ratio is larger than the additional PRT usage ratio.

In a twenty-second aspect, alone or in combination with one or more of the first through twenty-first aspects, the PRT sequence is determined based at least in part on a quantity of RBs associated with the set of allocated frequency resources.

In a twenty-third aspect, alone or in combination with one or more of the first through twenty-second aspects, the subset of PRTs is associated with an additional resource allocation corresponding to another UE.

In a twenty-fourth aspect, alone or in combination with one or more of the first through twenty-third aspects, the additional resource allocation comprises an additional set of allocated frequency resources that is adjacent, in a frequency domain, to the set of allocated frequency resources.

In a twenty-fifth aspect, alone or in combination with one or more of the first through twenty-fourth aspects, the subset of PRTs corresponds to a side-band associated with at least one of the UE, the other UE, or a combination thereof.

In a twenty-sixth aspect, alone or in combination with one or more of the first through twenty-fifth aspects, the subset of PRTs corresponds to an additional subset of data tones associated with the additional resource allocation.

In a twenty-seventh aspect, alone or in combination with one or more of the first through twenty-sixth aspects, process 400 includes receiving a rate-matching indication that indicates one or more resources associated with the subset of PRTs to be rate matched around, and transmitting the data transmission comprises rate matching around the one or more resources based at least in part on the rate-matching indication.

In a twenty-eighth aspect, alone or in combination with one or more of the first through twenty-seventh aspects, the one or more resources are associated with one or more power constraints corresponding to the other UE.

In a twenty-ninth aspect, alone or in combination with one or more of the first through twenty-eighth aspects, the data transmission is transmitted based at least in part on a condition that the subset of PRTs does not overlap the subset of data tones.

In a thirtieth aspect, alone or in combination with one or more of the first through twenty-ninth aspects, the condition is based at least in part on a failure to receive a rate-matching indication.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
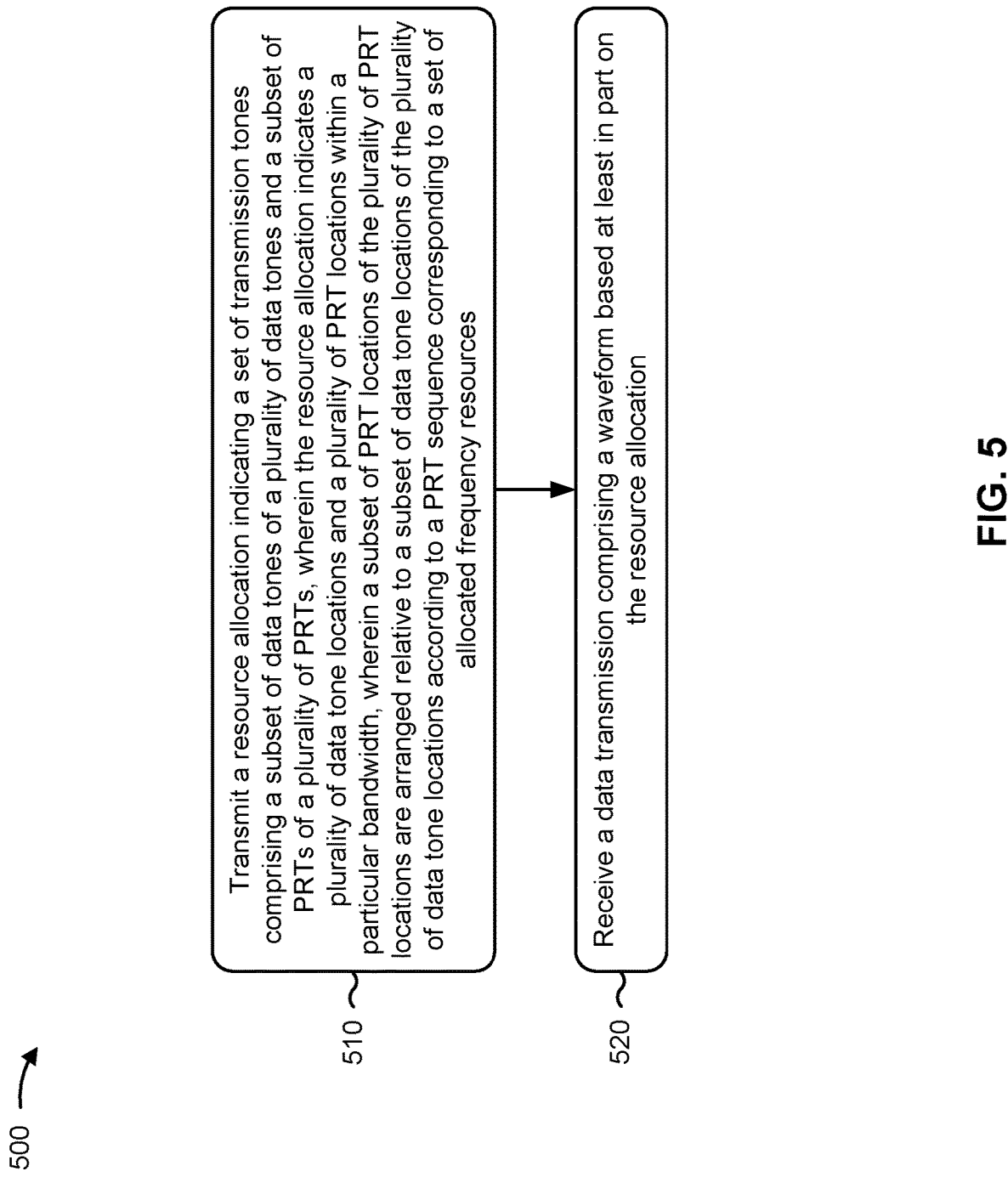
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 110 and/or the like) performs operations associated with tone reservation for PAPR reduction.

As shown in FIG. 5, in some aspects, process 500 may include transmitting a resource allocation indicating a plurality of transmission tones comprising a subset of data tones of a plurality of data tones and a subset of PRTs of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources (block 510). For example, the base station (e.g., using transmit processor 220, controller/processor 240, memory 242, and/or the like) may transmit a resource allocation indicating a plurality of transmission tones comprising a subset of data tones of a plurality of data tones and a subset of PRTs of a plurality of PRTs, as described above. In some aspects, the resource allocation indicates a plurality of data tone locations and a plurality of PRT locations within a particular bandwidth. In some aspects, a subset of PRT locations of the plurality of PRT locations are arranged relative to a subset of data tone locations of the plurality of data tone locations according to a PRT sequence corresponding to a set of allocated frequency resources.

As further shown in FIG. 5, in some aspects, process 500 may include receiving a data transmission comprising a waveform based at least in part on the resource allocation (block 520). For example, the base station (e.g., using receive processor 238, controller/processor 240, memory 242, and/or the like) may receive a data transmission comprising a waveform based at least in part on the resource allocation, as described above.

Process 500 may include additional aspects, such as any single aspect or any combination of aspects described below and/or in connection with one or more other processes described elsewhere herein.

In a first aspect, the resource allocation is carried in at least one of: DCI, an RRC message, a MAC-CE, or a combination thereof.

In a second aspect, alone or in combination with the first aspect, the waveform is based at least in part on an inverse discrete Fourier transform of the plurality of transmission tones.

In a third aspect, alone or in combination with one or more of the first and second aspects, the waveform comprises a CP-OFDM waveform or a DFT-s-OFDM waveform.

In a fourth aspect, alone or in combination with one or more of the first through third aspects, the subset of PRTs are selected such that a PAPR associated with the waveform satisfies a PAPR threshold.

In a fifth aspect, alone or in combination with one or more of the first through fourth aspects, the PRT sequence comprises a shifted version of a PRT pattern, and the PRT pattern corresponds to an additional set of allocated frequency resources.

In a sixth aspect, alone or in combination with one or more of the first through fifth aspects, the resource allocation indicates the PRT sequence by indicating a deterministic function for determining the PRT sequence.

In a seventh aspect, alone or in combination with one or more of the first through sixth aspects, the deterministic function comprises a pseudo-random number generator to generate the PRT sequence.

In an eighth aspect, alone or in combination with one or more of the first through seventh aspects, the pseudo-random number generator comprises a seed.

In a ninth aspect, alone or in combination with one or more of the first through eighth aspects, the resource allocation indicates the seed.

In a tenth aspect, alone or in combination with one or more of the first through ninth aspects, the resource allocation indicates the PRT sequence by indicating an index corresponding to the PRT sequence.

In an eleventh aspect, alone or in combination with one or more of the first through tenth aspects, the resource allocation indicates the PRT sequence by including a reference to a PRTT.

In a twelfth aspect, alone or in combination with one or more of the first through eleventh aspects, the set of allocated frequency resources comprises a set of RBs, and the PRT sequence is based at least in part on the PRTT and the set of RBs.

In a thirteenth aspect, alone or in combination with one or more of the first through twelfth aspects, the PRTT comprises a plurality of entries, and an entry of the plurality of entries comprises at least one of: the PRT sequence, wherein the PRT sequence corresponds to a plurality of RBs, an additional PRT sequence corresponding to an additional set of RBs, one or more parameters of a deterministic function for determining the PRT sequence, or a combination thereof.

In a fourteenth aspect, alone or in combination with one or more of the first through thirteenth aspects, the plurality of allocated frequency resources comprises a set of RBs, and the PRT sequence is based at least in part on the PRTT and a quantity of RBs in the set of RBs.

In a fifteenth aspect, alone or in combination with one or more of the first through fourteenth aspects, the PRTT comprises: a first entry corresponding to the PRT sequence, wherein the first entry is associated with a first quantity of RBs; and a second entry corresponding to an additional PRT sequence different than the PRT sequence, wherein the second entry is associated with a second quantity of RBs.

In a sixteenth aspect, alone or in combination with one or more of the first through fifteenth aspects, the PRT sequence is based at least in part on the PRTT and a PRT usage ratio corresponding to the resource allocation, and the PRT usage ratio comprises a ratio of a quantity of PRTs in the subset of PRTs to a quantity of data tones in the subset of data tones.

In a seventeenth aspect, alone or in combination with one or more of the first through sixteenth aspects, the PRT usage ratio is based at least in part on at least one of: an amount of data that the UE is to transmit in the data transmission, a PAPR associated with the UE, or a combination thereof.

In an eighteenth aspect, alone or in combination with one or more of the first through seventeenth aspects, the PRT usage ratio is based at least in part on at least one of: an amount of data that the UE is to transmit in the data transmission satisfying a data amount threshold, a PAPR associated with the UE satisfying a PAPR threshold, or a combination thereof.

In a nineteenth aspect, alone or in combination with one or more of the first through eighteenth aspects, the PRTT comprises: a first entry corresponding to the PRT sequence, wherein the first entry is associated with a first PRT usage ratio range that includes the PRT usage ratio; and a second entry corresponding to an additional PRT sequence different than the PRT sequence, wherein the second entry is associated with a second PRT usage ratio range that includes an additional PRT usage ratio.

In a twentieth aspect, alone or in combination with one or more of the first through nineteenth aspects, an amount of data that the UE is to transmit in the data transmission is larger than an amount of data that another UE is to transmit in another data transmission, and the PRT usage ratio is smaller than the additional PRT usage ratio.

In a twenty-first aspect, alone or in combination with one or more of the first through twentieth aspects, a first PAPR associated with the UE is greater than a second PAPR associated with an additional UE, and the PRT usage ratio is larger than the additional PRT usage ratio.

In a twenty-second aspect, alone or in combination with one or more of the first through twenty-first aspects, the PRT sequence is based at least in part on a quantity of resource blocks associated with the set of allocated frequency resources.

In a twenty-third aspect, alone or in combination with one or more of the first through twenty-second aspects, the subset of PRTs is associated with an additional resource allocation corresponding to another UE.

In a twenty-fourth aspect, alone or in combination with one or more of the first through twenty-third aspects, the additional resource allocation comprises an additional set of allocated frequency resources that is adjacent, in a frequency domain, to the set of allocated frequency resources.

In a twenty-fifth aspect, alone or in combination with one or more of the first through twenty-fourth aspects, the subset of PRTs corresponds to a side-band associated with at least one of the UE, the other UE, or a combination thereof.

In a twenty-sixth aspect, alone or in combination with one or more of the first through twenty-fifth aspects, the subset of PRTs corresponds to an additional subset of data tones associated with the additional resource allocation.

In a twenty-seventh aspect, alone or in combination with one or more of the first through twenty-sixth aspects, process 500 includes transmitting a rate-matching indication that indicates one or more resources associated with the subset of PRTs to be rate matched around, and the data transmission is based at least in part on rate matching around the one or more resources based at least in part on the rate-matching indication.

In a twenty-eighth aspect, alone or in combination with one or more of the first through twenty-seventh aspects, the one or more resources are associated with one or more power constraints corresponding to the other UE.

In a twenty-ninth aspect, alone or in combination with one or more of the first through twenty-eighth aspects, the data transmission is transmitted based at least in part on a condition that the subset of PRTs does not overlap the subset of data tones.

In a thirtieth aspect, alone or in combination with one or more of the first through twenty-ninth aspects, the condition is based at least in part on a failure to receive a rate-matching indication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and transmitting a data transmission using a waveform based at least in part on the resource allocation.

Aspect 2: The method of Aspect 1, wherein the resource allocation is carried in at least one of: downlink control information, a radio resource control message, a medium access control control element, or a combination thereof.

Aspect 3: The method of either of Aspects 1 or 2, further comprising generating the waveform by determining an inverse discrete Fourier transform of the plurality of transmission tones.

Aspect 4: The method of any of Aspects 1-3, wherein the waveform comprises a cyclic prefix orthogonal frequency division multiplexing (OFDM) waveform or a discrete Fourier transform spread OFDM waveform.

Aspect 5: The method of any of Aspects 1-4, wherein the subset of PRTs are selected such that a peak to average power ratio (PAPR) associated with the waveform satisfies a PAPR threshold.

Aspect 6: The method of any of Aspects 1-5, wherein the PRT sequence comprises a shifted version of a PRT pattern, wherein the PRT pattern corresponds to an additional set of allocated frequency resources.

Aspect 7: The method of any of Aspects 1-6, wherein the resource allocation indicates the PRT sequence by indicating a deterministic function for determining the PRT sequence.

Aspect 8: The method of Aspect 7, wherein the deterministic function comprises a pseudo-random number generator to generate the PRT sequence.

Aspect 9: The method of Aspect 8, wherein the pseudo-random number generator comprises a seed.

Aspect 10: The method of Aspect 9, wherein the resource allocation indicates the seed.

Aspect 11: The method of any of Aspects 1-10, wherein the resource allocation indicates the PRT sequence by indicating an index corresponding to the PRT sequence.

Aspect 12: The method of any of Aspects 1-11, wherein the resource allocation indicates the PRT sequence by including a reference to a PRT table (PRTT).

Aspect 13: The method of Aspect 12, wherein the set of allocated frequency resources comprises a set of resource blocks (RBs), and the method further comprising determining, using the PRTT, the PRT sequence based at least in part on the set of RBs.

Aspect 14: The method of either of Aspects 12 or 13, wherein the PRTT comprises a plurality of entries, wherein an entry of the plurality of entries comprises at least one of: the PRT sequence, wherein the PRT sequence corresponds to a set of resource blocks (RBs), an additional PRT sequence corresponding to an additional set of RBs, one or more parameters of a deterministic function for determining the PRT sequence, or a combination thereof.

Aspect 15: The method of any of Aspects 12-14, wherein the set of allocated frequency resources comprises a set of resource blocks (RBs), and the method further comprising determining, using the PRTT, the PRT sequence based at least in part on a quantity of RBs in the set of RBs.

Aspect 16: The method of any of Aspects 12-15, wherein the PRTT comprises: a first entry corresponding to the PRT sequence, wherein the first entry is associated with a first quantity of resource blocks (RBs); and a second entry corresponding to an additional PRT sequence different than the PRT sequence, wherein the second entry is associated with a second quantity of RBs.

Aspect 17: The method of any of Aspects 12-16, further comprising determining, using the PRTT, the PRT sequence based at least in part on a PRT usage ratio corresponding to the resource allocation, wherein the PRT usage ratio comprises a ratio of a quantity of PRTs in the subset of PRTs to a quantity of data tones in the subset of data tones.

Aspect 18: The method of Aspect 17, wherein the PRT usage ratio is based at least in part on at least one of: an amount of data that the UE is to transmit in the data transmission, a peak to average power ratio associated with the UE, or a combination thereof.

Aspect 19: The method of either of Aspects 17 or 18, wherein the PRT usage ratio is based at least in part on at least one of: an amount of data that the UE is to transmit in the data transmission satisfying a data amount threshold, a peak to average power ratio (PAPR) associated with the UE satisfying a PAPR threshold, or a combination thereof.

Aspect 20: The method of any of Aspects 17-19, wherein the PRTT comprises: a first entry corresponding to the PRT sequence, wherein the first entry is associated with a first PRT usage ratio range that includes the PRT usage ratio; and a second entry corresponding to an additional PRT sequence different than the PRT sequence, wherein the second entry is associated with a second PRT usage ratio range that includes an additional PRT usage ratio.

Aspect 21: The method of Aspect 20, wherein an amount of data that the UE is to transmit in the data transmission is larger than an amount of data that another UE is to transmit in another data transmission, and wherein the PRT usage ratio is smaller than the additional PRT usage ratio.

Aspect 22: The method of either of Aspects 20 or 21, wherein a first peak to average power ratio (PAPR) associated with the UE is greater than a second PAPR associated with an additional UE, and wherein the PRT usage ratio is larger than the additional PRT usage ratio.

Aspect 23: The method of any of Aspects 1-22, wherein the PRT sequence is determined based at least in part on a quantity of resource blocks associated with the set of allocated frequency resources.

Aspect 24: The method of any of Aspects 1-23, wherein the subset of PRTs is associated with an additional resource allocation corresponding to another UE.

Aspect 25: The method of Aspect 24, wherein the additional resource allocation comprises an additional set of allocated frequency resources that is adjacent, in a frequency domain, to the set of allocated frequency resources.

Aspect 26: The method of either of Aspects 24 or 25, wherein the subset of PRTs corresponds to a side-band associated with at least one of the UE, the other UE, or a combination thereof.

Aspect 27: The method of any of Aspects 24-26, wherein the subset of PRTs corresponds to an additional subset of data tones associated with the additional resource allocation.

Aspect 28: The method of Aspect 27, further comprising: receiving a rate-matching indication that indicates one or more resources associated with the subset of PRTs to be rate matched around, and wherein transmitting the data transmission comprises rate matching around the one or more resources based at least in part on the rate-matching indication.

Aspect 29: The method of Aspect 28, wherein the one or more resources are associated with one or more power constraints corresponding to the other UE.

Aspect 30: The method of any of Aspects 1-29, wherein the data transmission is transmitted based at least in part on a condition that the subset of PRTs does not overlap the subset of data tones.

Aspect 31: The method of Aspect 30, wherein the condition is based at least in part on a failure to receive a rate-matching indication.

Aspect 32: A method of wireless communication performed by a base station, comprising: transmitting a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and receiving a data transmission comprising a waveform based at least in part on the resource allocation.

Aspect 33: The method of Aspect 32, wherein the resource allocation is carried in at least one of: downlink control information, a radio resource control message, a medium access control control element, or a combination thereof.

Aspect 34: The method of either of Aspects 32 or 33, wherein the waveform is based at least in part on an inverse discrete Fourier transform of the plurality of transmission tones.

Aspect 35: The method of any of Aspects 32-34, wherein the waveform comprises a cyclic prefix orthogonal frequency division multiplexing (OFDM) waveform or a discrete Fourier transform spread OFDM waveform.

Aspect 36: The method of any of Aspects 32-35, wherein the subset of PRTs are selected such that a peak to average power ratio (PAPR) associated with the waveform satisfies a PAPR threshold.

Aspect 37: The method of any of Aspects 32-36, wherein the PRT sequence comprises a shifted version of a PRT pattern, wherein the PRT pattern corresponds to an additional set of allocated frequency resources.

Aspect 38: The method of any of Aspects 32-37, wherein the resource allocation indicates the PRT sequence by indicating a deterministic function for determining the PRT sequence.

Aspect 39: The method of Aspect 38, wherein the deterministic function comprises a pseudo-random number generator to generate the PRT sequence.

Aspect 40: The method of Aspect 39, wherein the pseudo-random number generator comprises a seed.

Aspect 41: The method of Aspect 40, wherein the resource allocation indicates the seed.

Aspect 42: The method of any of Aspects 32-41, wherein the resource allocation indicates the PRT sequence by indicating an index corresponding to the PRT sequence.

Aspect 43: The method of any of Aspects 32-42, wherein the resource allocation indicates the PRT sequence by including a reference to a PRT table (PRTT).

Aspect 44: The method of Aspect 43, wherein the set of allocated frequency resources comprises a set of resource blocks (RBs), and wherein the PRT sequence is based at least in part on the PRTT and the set of RBs.

Aspect 45: The method of either of Aspects 43 or 44, wherein the PRTT comprises a plurality of entries, wherein an entry of the plurality of entries comprises at least one of: the PRT sequence, wherein the PRT sequence corresponds to a set of resource blocks (RBs), an additional PRT sequence corresponding to an additional set of RBs, one or more parameters of a deterministic function for determining the PRT sequence, or a combination thereof.

Aspect 46: The method of any of Aspects 43-45, wherein the set of allocated frequency resources comprises a set of resource blocks (RBs), and wherein the PRT sequence is based at least in part on the PRTT and a quantity of RBs in the set of RBs.

Aspect 47: The method of any of Aspects 43-46, wherein the PRTT comprises: a first entry corresponding to the PRT sequence, wherein the first entry is associated with a first quantity of resource blocks (RBs); and a second entry corresponding to an additional PRT sequence different than the PRT sequence, wherein the second entry is associated with a second quantity of RBs.

Aspect 48: The method of any of Aspects 43-47, wherein the PRT sequence is based at least in part on the PRTT and a PRT usage ratio corresponding to the resource allocation, wherein the PRT usage ratio comprises a ratio of a quantity of PRTs in the subset of PRTs to a quantity of data tones in the subset of data tones.

Aspect 49: The method of Aspect 48, wherein the PRT usage ratio is based at least in part on at least one of: an amount of data that the UE is to transmit in the data transmission, a peak to average power ratio associated with the UE, or a combination thereof.

Aspect 50: The method of either of Aspects 48 or 49, wherein the PRT usage ratio is based at least in part on at least one of: an amount of data that the UE is to transmit in the data transmission satisfying a data amount threshold, a peak to average power ratio (PAPR) associated with the UE satisfying a PAPR threshold, or a combination thereof.

Aspect 51: The method of any of Aspects 48-50, wherein the PRTT comprises: a first entry corresponding to the PRT sequence, wherein the first entry is associated with a first PRT usage ratio range that includes the PRT usage ratio; and a second entry corresponding to an additional PRT sequence different than the PRT sequence, wherein the second entry is associated with a second PRT usage ratio range that includes an additional PRT usage ratio.

Aspect 52: The method of Aspect 51, wherein an amount of data that the UE is to transmit in the data transmission is larger than an amount of data that another UE is to transmit in another data transmission, and wherein the PRT usage ratio is smaller than the additional PRT usage ratio.

Aspect 53: The method of either of Aspects 51 or 52, wherein a first peak to average power ratio (PAPR) associated with the UE is greater than a second PAPR associated with an additional UE, and wherein the PRT usage ratio is larger than the additional PRT usage ratio.

Aspect 54: The method of any of Aspects 32-53, wherein the PRT sequence is based at least in part on a quantity of resource blocks associated with the set of allocated frequency resources.

Aspect 55: The method of any of Aspects 32-54, wherein the subset of PRTs is associated with an additional resource allocation corresponding to another UE.

Aspect 56: The method of Aspect 55, wherein the additional resource allocation comprises an additional set of allocated frequency resources that is adjacent, in a frequency domain, to the set of allocated frequency resources.

Aspect 57: The method of either of Aspects 55 or 56, wherein the subset of PRTs corresponds to a side-band associated with at least one of the UE, the other UE, or a combination thereof.

Aspect 58: The method of any of Aspects 55-57, wherein the subset of PRTs corresponds to an additional subset of data tones associated with the additional resource allocation.

Aspect 59: The method of Aspect 58, further comprising: transmitting a rate-matching indication that indicates one or more resources associated with the subset of PRTs to be rate matched around, and wherein the data transmission is based at least in part on rate matching around the one or more resources based at least in part on the rate-matching indication.

Aspect 60: The method of Aspect 59, wherein the one or more resources are associated with one or more power constraints corresponding to the other UE.

Aspect 61: The method of any of Aspects 32-60, wherein the data transmission is transmitted based at least in part on a condition that the subset of PRTs does not overlap the subset of data tones.

Aspect 62: The method of Aspect 61, wherein the condition is based at least in part on a failure to receive a rate-matching indication.

Aspect 63: An apparatus for wireless communication at a device, comprising a processor; memory coupled with the processor; and instructions stored in the memory and executable by the processor to cause the apparatus to perform the method of one or more of Aspects 1-62.

Aspect 64: A device for wireless communication, comprising a memory and one or more processors coupled to the memory, the memory and the one or more processors configured to perform the method of one or more of Aspects 1-31.

Aspect 65: An apparatus for wireless communication, comprising at least one means for performing the method of one or more of Aspects 1-31.

Aspect 66: A non-transitory computer-readable medium storing code for wireless communication, the code comprising instructions executable by a processor to perform the method of one or more of Aspects 1-31.

Aspect 67: A non-transitory computer-readable medium storing a set of instructions for wireless communication, the set of instructions comprising one or more instructions that, when executed by one or more processors of a device, cause the device to perform the method of one or more of Aspects 1-31.

Aspect 68: An apparatus for wireless communication at a device, comprising a processor; memory coupled with the processor; and instructions stored in the memory and executable by the processor to cause the apparatus to perform the method of one or more of Aspects 32-62.

Aspect 69: A device for wireless communication, comprising a memory and one or more processors coupled to the memory, the memory and the one or more processors configured to perform the method of one or more of Aspects 32-62.

Aspect 70: An apparatus for wireless communication, comprising at least one means for performing the method of one or more of Aspects 32-62.

Aspect 71: A non-transitory computer-readable medium storing code for wireless communication, the code comprising instructions executable by a processor to perform the method of one or more of Aspects 32-62.

Aspect 72: A non-transitory computer-readable medium storing a set of instructions for wireless communication, the set of instructions comprising one or more instructions that, when executed by one or more processors of a device, cause the device to perform the method of one or more of Aspects 32-62.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and
      transmit a data transmission using a waveform based at least in part on the resource allocation.

2. The UE of claim 1, wherein the subset of PRTs are selected such that a peak to average power ratio (PAPR) associated with the waveform satisfies a PAPR threshold.

3. The UE of claim 1, wherein the PRT sequence comprises a shifted version of a PRT pattern, wherein the PRT pattern corresponds to an additional set of allocated frequency resources.

4. The UE of claim 1, wherein the resource allocation indicates the PRT sequence by indicating a deterministic function for determining the PRT sequence.

5. The UE of claim 4, wherein the deterministic function comprises a pseudo-random number generator to generate the PRT sequence.

6. The UE of claim 4, wherein the pseudo-random number generator comprises a seed, wherein the resource allocation indicates the seed.

7. The UE of claim 1, wherein the resource allocation indicates the PRT sequence by indicating an index corresponding to the PRT sequence.

8. The UE of claim 1, wherein the resource allocation indicates the PRT sequence by including a reference to a PRT table (PRTT).

9. The UE of claim 8, wherein the set of allocated frequency resources comprises a set of resource blocks (RBs), and wherein the one or more processors are configured to determine, using the PRTT, the PRT sequence based at least in part on the set of RBs.

10. The UE of claim 8, wherein the PRTT comprises a plurality of entries, wherein an entry of the plurality of entries comprises at least one of:
   the PRT sequence, wherein the PRT sequence corresponds to a set of resource blocks (RBs),
   an additional PRT sequence corresponding to an additional set of RBs,
   one or more parameters of a deterministic function for determining the PRT sequence, or
   a combination thereof.

11. The UE of claim 8, wherein the set of allocated frequency resources comprises a set of resource blocks (RBs), and wherein the one or more processors are configured to determine, using the PRTT, the PRT sequence based at least in part on a quantity of RBs in the set of RBs.

12. The UE of claim 8, wherein the PRTT comprises:
a first entry corresponding to the PRT sequence, wherein the first entry is associated with a first quantity of resource blocks (RBs); and
a second entry corresponding to an additional PRT sequence different than the PRT sequence, wherein the second entry is associated with a second quantity of RBs.

13. The UE of claim 8, wherein the one or more processors are further configured to determine, using the PRTT, the PRT sequence based at least in part on a PRT usage ratio corresponding to the resource allocation, wherein the PRT usage ratio comprises a ratio of a quantity of PRTs in the subset of PRTs to a quantity of data tones in the subset of data tones.

14. The UE of claim 13, wherein the PRT usage ratio is based at least in part on at least one of:
an amount of data that the UE is to transmit in the data transmission,
a peak to average power ratio associated with the UE, or
a combination thereof.

15. The UE of claim 13, wherein the PRT usage ratio is based at least in part on at least one of:
an amount of data that the UE is to transmit in the data transmission satisfying a data amount threshold,
a peak to average power ratio (PAPR) associated with the UE satisfying a PAPR threshold, or
a combination thereof.

16. The UE of claim 13, wherein the PRTT comprises:
a first entry corresponding to the PRT sequence, wherein the first entry is associated with a first PRT usage ratio range that includes the PRT usage ratio; and
a second entry corresponding to an additional PRT sequence different than the PRT sequence, wherein the second entry is associated with a second PRT usage ratio range that includes an additional PRT usage ratio.

17. The UE of claim 16, wherein an amount of data that the UE is to transmit in the data transmission is larger than an amount of data that another UE is to transmit in another data transmission, and
wherein the PRT usage ratio is smaller than the additional PRT usage ratio.

18. The UE of claim 16, wherein a first peak to average power ratio (PAPR) associated with the UE is greater than a second PAPR associated with an additional UE, and
wherein the PRT usage ratio is larger than the additional PRT usage ratio.

19. The UE of claim 1, wherein the PRT sequence is based at least in part on a quantity of resource blocks associated with the set of allocated frequency resources.

20. The UE of claim 1, wherein the subset of PRTs is associated with an additional resource allocation corresponding to another UE.

21. The UE of claim 20, wherein the additional resource allocation comprises an additional set of allocated frequency resources that is adjacent, in a frequency domain, to the set of allocated frequency resources.

22. The UE of claim 20, wherein the subset of PRTs corresponds to a side-band associated with at least one of the UE, the other UE, or a combination thereof.

23. The UE of claim 20, wherein the subset of PRTs corresponds to an additional subset of data tones associated with the additional resource allocation.

24. The UE of claim 23, wherein the one or more processors are further configured to:
receive a rate-matching indication that indicates one or more resources associated with the subset of PRTs to be rate matched around, and
wherein the one or more processors, to transmit the data transmission, are configured to rate match around the one or more resources based at least in part on the rate-matching indication.

25. The UE of claim 24, wherein the one or more resources are associated with one or more power constraints corresponding to the other UE.

26. The UE of claim 1, wherein, to transmit the data transmission, the one or more processors are configured to transmit the data transmission based at least in part on a condition that the subset of PRTs does not overlap the subset of data tones.

27. The UE of claim 26, wherein the condition is based at least in part on a failure to receive a rate-matching indication.

28. A base station for wireless communication, comprising:
a memory; and
one or more processors, coupled to the memory, configured to:
transmit a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and
receive a data transmission comprising a waveform based at least in part on the resource allocation.

29. A method of wireless communication performed by a user equipment (UE), comprising:
receiving a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and
transmitting a data transmission using a waveform based at least in part on the resource allocation.

30. A method of wireless communication performed by a base station, comprising:
transmitting a resource allocation indicating a plurality of transmission tones comprising a subset of data tones of a plurality of data tones and a subset of peak reduction tones (PRTs) of a plurality of PRTs, wherein the resource allocation indicates a plurality of data tone locations and a plurality of PRT locations within a particular bandwidth, wherein a subset of PRT locations of the plurality of PRT locations are arranged relative to a subset of data tone locations of the plurality of data tone locations according to a PRT sequence corresponding to a set of allocated frequency resources; and receiving a data transmission comprising a waveform based at least in part on the resource allocation.

* * * * *